(12) United States Patent
Harada et al.

(10) Patent No.: US 11,902,987 B2
(45) Date of Patent: Feb. 13, 2024

(54) RADIO NODE AND RADIO COMMUNICATION METHOD

(71) Applicant: NTT DOCOMO, INC., Tokyo (JP)

(72) Inventors: Hiroki Harada, Tokyo (JP); Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 520 days.

(21) Appl. No.: 17/266,414

(22) PCT Filed: Aug. 7, 2018

(86) PCT No.: PCT/JP2018/029620
§ 371 (c)(1),
(2) Date: Feb. 5, 2021

(87) PCT Pub. No.: WO2020/031263
PCT Pub. Date: Feb. 13, 2020

(65) Prior Publication Data
US 2021/0298055 A1    Sep. 23, 2021

(51) Int. Cl.
*H04W 72/12* (2023.01)
*H04W 72/23* (2023.01)
*H04W 56/00* (2009.01)
*H04W 72/1273* (2023.01)

(52) U.S. Cl.
CPC ......... *H04W 72/23* (2023.01); *H04W 56/001* (2013.01); *H04W 72/1273* (2013.01)

(58) Field of Classification Search
CPC ..... H04W 4/40; H04W 72/23; H04W 56/005; H04W 84/04; H04W 56/00; H04W 56/001; H04W 74/0833; H04W 48/08; H04W 48/12; H04W 16/26; H04W 84/047; H04W 74/006
See application file for complete search history.

(56) References Cited

U.S. PATENT DOCUMENTS

| | | | |
|---|---|---|---|
| 11,252,748 B2* | 2/2022 | Islam | H04W 72/53 |
| 11,297,586 B2* | 4/2022 | Kim | H04W 56/001 |
| 2018/0092139 A1 | 3/2018 | Novlan et al. | |
| 2019/0349162 A1* | 11/2019 | Qi | H04W 24/08 |
| 2020/0077320 A1 | 3/2020 | Shimoda et al. | |

(Continued)

FOREIGN PATENT DOCUMENTS

| | | |
|---|---|---|
| JP | 2012524433 A | 10/2012 |
| WO | 2018063892 A1 | 4/2018 |

(Continued)

OTHER PUBLICATIONS

Office Action issued in counterpart Japanese Patent Application No. 2020-535371 dated Oct. 25, 2022 (6 pages).

(Continued)

*Primary Examiner* — Jung Liu
(74) *Attorney, Agent, or Firm* — Osha Bergman Watanabe & Burton LLP

(57) ABSTRACT

A radio node includes: a reception section that receives information used for initial access to another radio node in a first cell; and a control section that controls the initial access based on the information. The control section controls reception of the information based on a period equal to or longer than a period defined for a user terminal in a second cell with respect to transmission of the information.

5 Claims, 6 Drawing Sheets

(56) References Cited

U.S. PATENT DOCUMENTS

| | | | |
|---|---|---|---|
| 2020/0084699 A1 | 3/2020 | Takahashi et al. | |
| 2021/0014777 A1* | 1/2021 | You | H04W 40/24 |
| 2021/0014918 A1* | 1/2021 | Novlan | H04W 76/14 |
| 2021/0243708 A1* | 8/2021 | Kim | H04W 4/40 |
| 2021/0250884 A1* | 8/2021 | Iyer | H04W 56/0045 |
| 2021/0251011 A1* | 8/2021 | You | H04W 74/0833 |
| 2022/0272697 A1* | 8/2022 | You | H04W 28/16 |

FOREIGN PATENT DOCUMENTS

| | | |
|---|---|---|
| WO | 2018/124259 A1 | 7/2018 |
| WO | 2018/128016 A1 | 7/2018 |

OTHER PUBLICATIONS

3GPP TR 38.874 V0.3.2 "3rd Generation Partnership Project; Technical Specification Group Radio Access Network; Study on Integrated Access and Backhaul; (Release 15)" Jun. 2018 (40 pages).
3GPP TSG RAN Meeting #78; RP-172290 "Study on Integrated Access and Backhaul for NR" AT&T, Qualcomm, Samsung; Lisbon, Portugal; Dec. 18-21, 2017 (5 pages).
3GPP TS 38.213 V15.2.0 "3rd Generation Partnership Project; Technical Specification Group Radio Access Network; NR; Physical layer procedures for control (Release 15)" Jun. 2018 (99 pages).
3GPP TS 38.331 V15.2.1 "3rd Generation Partnership Project; Technical Specification Group Radio Access Network; NR; Radio Resource Control (RRC) protocol specification (Release 15)" Jun. 2018 (303 pages).
International Search Report issued in International Application No. PCT/JP2018/029620, dated Oct. 23, 2018 (5 pages).
Written Opinion issued in International Application No. PCT/JP2018/029620; dated Oct. 23, 2018 (4 pages).
Reconsideration Report issued in counterpart Japanese Patent Application No. 2020-535371 dated Mar. 7, 2023 (8 pages).
3GPP TSG RAN WG1 Meeting #93; R1-1806026 "Discussion on IAB node initial access process" ZTE; Busan, Korea; May 21-25, 2018 (10 pages).
3GPP TSG RAN WG1 Meeting #93; R1-1806649 "Discussions on NR IAB support" LG Electronics; Busan, Korea; May 21-25, 2018 (12 pages).
Office Action issued in Japanese Application No. 2020-535371; dated Jun. 21, 2022 (8 pages).
3GPP TSG RAN WG1 Meeting #93; R1-1806970 "Overview of physical layer enhancements for IAB" AT&T Busan, Korea; May 21-25, 2018 (10 pages).
3GPP TSG RAN WG1 Meeting #93; R1-1807395 "Inter-IAB-node discovery" Qualcomm Incorporated; Busan, Korea; May 21-25, 2018 (8 pages).
3GPP TSG RAN WG1 Meeting #94-bis; R1-1810677 "Discovery and measurements for IAB" Nokia, Nokia Shanghai Bell; Chengdu, P.R. China; Oct. 8-12, 2018 (7 pages).
3GPP TSG RAN WG1 Ad-Hoc Meeting 1901; R1-1900790 "On SSB and RMSI for IAB Initial Access in NR" InterDigital Inc.; Taipei, Taiwan; Jan. 21-25, 2019 (3 pages).
3GPP TSG RAN WG1 Meeting AH1901; R1-1900878 "Proposal for SSB/RMSI periodicity" Qualcomm Incorporated; Taipei, Taiwan; Jan. 21-25, 2019 (2 pages).
3GPP TSG-RAN WG4 Meeting #85; R4-1712810 "Discussion on requirements for NR RLM" LG Electronics; Reno, Nevada, USA; Nov. 27-Dec. 1, 2017 (4 pages).
Office Action issued in Russian Application No. 2021102695/07; dated Dec. 20, 2021 (12 pages).
Extended European Search Report issued in European Application No. 18929728.6, dated Feb. 21, 2022 (11 pages).
Office Action issued in Chinese Application No. 201880096400.3; dated Aug. 28, 2023 (16 pages).
Office Action in the counterpart European Application No. 18929728.6, dated Jun. 23, 2023 (7 pages).

* cited by examiner

```
MIB ::= SEQUENCE {
        systemFrameNumber           BIT STRING (SIZE (6)),
        subCarrierSpacingCommon     ENUMERATED {scs15or60, scs30or120},
        ssb-SubcarrierOffset        INTEGER (0..15),
        dmrs-TypeA-Position         ENUMERATED {pos2, pos3},
        pdcch-ConfigSIB1            INTEGER (0..255),
        cellBarred                  ENUMERATED {barred, notBarred},
        intraFreqReselection        ENUMERATED {allowed, notAllowed},
        spare                       BIT STRING (SIZE (1))
}
```

FIG. 4

| $k_{SSB}$ | RMSI-PDCCH-Config | $N_{GSCN}^{Offset}$ |
|---|---|---|
| 24 | 0, 1, ···, 255 | 1, 2, ···, 256 |
| 25 | 0, 1, ···, 255 | 257, 258, ···, 512 |
| 26 | 0, 1, ···, 255 | 513, 514, ···, 768 |
| 27 | 0, 1, ···, 255 | −1, −2, ···, −256 |
| 28 | 0, 1, ···, 255 | −257, −258, ···, −512 |
| 29 | 0, 1, ···, 255 | −513, −514, ···, −768 |
| 30 | 0, 1, ···, 255 | Reserved, Reserved, ···, Reserved |

FIG. 5A

| $k_{SSB}$ | RMSI-PDCCH-Config | $N_{GSCN}^{Offset}$ |
|---|---|---|
| 12 | 0, 1, ···, 255 | 1, 2, ···, 256 |
| 13 | 0, 1, ···, 255 | −1, −2, ···, −256 |
| 14 | 0, 1, ···, 255 | Reserved, Reserved, ···, Reserved |

FIG. 5B

RADIO NODE AND RADIO COMMUNICATION METHOD

TECHNICAL FIELD

The present invention relates to a radio node and a radio communication method.

BACKGROUND ART

Long Term Evolution (LTE) has been specified for achieving a higher data rate, lower latency, and the like in a Universal Mobile Telecommunications System (UMTS) network. Successor systems of LTE have also been studied for achieving a broader bandwidth and a higher speed based on LTE. Examples of successor systems of LTE include the systems called LTE-Advanced (LTE-A), Future Radio Access (FRA), 5th generation mobile communication system (5G), 5G plus (5G+), New Radio Access Technology (New-RAT)), New Radio (NR) and the like.

The technology of Integrated Access and Backhaul (IAB) in which an access link and a backhaul link are integrated has been discussed for the future radio communication system (for example, 5G) (refer to Non-Patent Literature 1). In the IAB, a radio node such as an IAB node forms a radio access link to a user terminal (User Equipment (UE)) and also forms a radio backhaul link to another IAB node and/or a radio base station.

CITATION LIST

Non-Patent Literature

NPL 1

3GPP TR 38.874 V0.3.2 "3rd Generation Partnership Project; Technical Specification Group Radio Access Network; Study on Integrated Access and Backhaul (Release 15)," June 2018

NPL 2

3GPP TSG RAN Meeting #78 RP-172290 "New SID Proposal: Study on Integrated Access and Backhaul for NR", December 2017

NPL 3

3GPP TS38.213 V15.2.0 "3rd Generation Partnership Project; Technical Specification Group Radio Access Network; NR; Physical layer procedures for control (Release 15)", June 2018

NPL 4

3GPP TS38.331 V15.2.1 "3rd Generation Partnership Project; Technical Specification Group Radio Access Network; NR; Radio Resource Control (RRC) protocol specification (Release 15)", June 2018

SUMMARY OF INVENTION

Technical Problem

However, insufficient studies have been made on an initial connection procedure for the backhaul link of a radio node such as an IAB node, and further studies have been required.

An object of one aspect of the present disclosure is to provide a radio node and a radio communication method having an optimized initial connection procedure for the backhaul link.

Solution to Problem

A radio node according to one aspect of the present disclosure includes: a reception section that receives information used for initial access to another radio node in a first cell; and a control section that controls the initial access based on the information, in which the control section controls reception of the information based on a period equal to or longer than a period defined for a user terminal in a second cell with respect to transmission of the information.

Advantageous Effects of Invention

According to the present disclosure, an initial connection procedure for the backhaul link can be optimized.

BRIEF DESCRIPTION OF DRAWINGS

FIG. 4 illustrates exemplary definition of a Master Information Block (MIB) according to an embodiment of the present invention;

FIG. 5A illustrates exemplary definition of $k_{SSB}$ in Frequency Range (FR) 1 according to an embodiment of the present invention;

FIG. 5B illustrates exemplary definition of $k_{SSB}$ in FR 2 according to an embodiment of the present invention.

DESCRIPTION OF EMBODIMENTS

Embodiments of the present disclosure will be described below with reference to the accompanying drawings.

<System Configuration>

Figure 1:
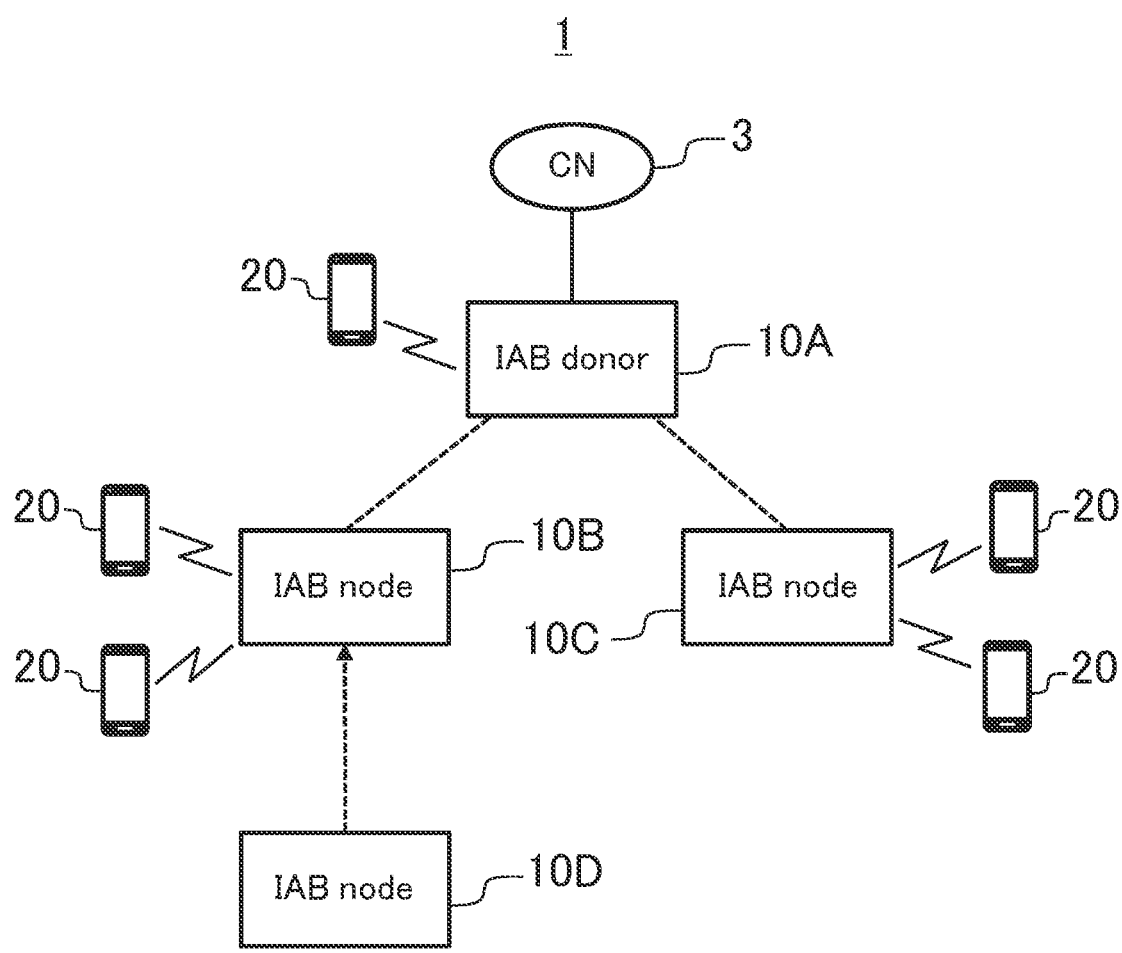
FIG. 1 illustrates an exemplary configuration of a radio communication system according to an embodiment of the present invention.

FIG. 1 illustrates an exemplary configuration of a radio communication system according to an embodiment of the present invention.

Radio communication system 1 includes IAB donor 10A, IAB nodes 10B, 10C, and 10D, and UE 20 as an exemplary user terminal. In the following description, only a common number in the reference signs is sometimes used like "IAB node 10" when IAB nodes 10B to 10D are not distinguished from each other. The expression of "IAB node 10" may include IAB donor 10A.

IAB donor 10A is an exemplary radio node connected with Core Network (CN) 3 through a wired cable (for example, an optical fiber cable). IAB donor 10A may be connected with CN 3 through radio communication. The expression of "donor" is merely exemplary and may also referred to as, for example, a core, a root, an end point, or a node.

IAB nodes 10B, 10C, and 10D are exemplary radio nodes each connected with another IAB node 10 through radio communication. Hereinafter, IAB node 10 already forming a backhaul network is referred to as an "existing IAB node". The existing IAB node includes IAB donor 10A. IAB node 10 which newly joins the backhaul network is referred to as "new IAB node".

Each IAB node 10 forms a cell as an area in which radio communication is possible. In other words, IAB node 10 functions as a base station. UE 20 in the cell can be connected by radio with IAB node 10 forming the cell.

<Configuration of IAB Node 10>

Figure 2:
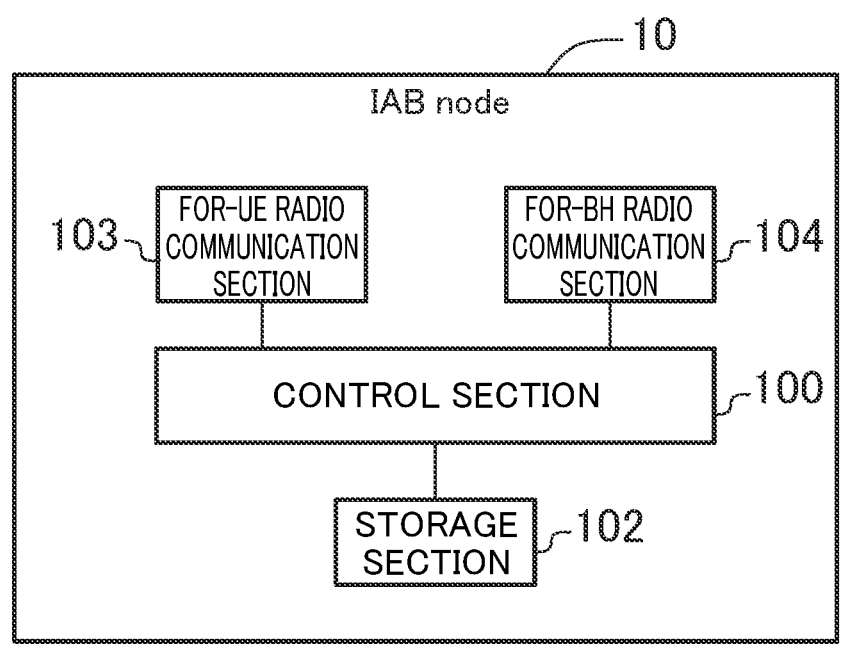
FIG. 2 illustrates an exemplary configuration of an IAB node according to an embodiment of the present invention.

FIG. 2 illustrates an exemplary configuration of IAB node 10.

As illustrated in FIG. 2, IAB node 10 includes control section 100, storage section 102, for-UE radio communication section 103, and for-Backhaul (BH) radio communication section 104.

For-UE radio communication section 103 processes radio communication with UE 20.

For-BH radio communication section 104 processes radio communication with another IAB node 10.

Control section 100 controls the radio communication of for-UE radio communication section 103. Control section 100 also controls the radio communication of for-BH radio communication section 104. The operation of control section 100 will be described later in detail.

Storage section 102 stores various kinds of information used for the operation of control section 100.

Although not illustrated, IAB donor 10A may include a for-CN communication unit configured to process communication with CN 3 in addition to components illustrated in FIG. 2. In the following description, the connection destination of new IAB node 10 is existing IAB node 10, but may be IAB donor 10A.

<Study Item>

New IAB node 10 can establish initial connection with an existing IAB node through an initial connection procedure same as that for UE 20 (refer to NPL 2). The connection procedure includes cell search, System Information (SI) acquisition, and random access.

The operation of the radio communication system includes a Stand Alone (SA) operation and a Non Stand Alone (NSA) operation. In the SA operation, UE 20 can perform communication with an NR radio node (base station). In the NSA operation, UE 20 can perform communication with an LTE radio node (base station) and an NR radio node (base station). Hereinafter, a cell formed by an NR radio node is referred to as an "NR cell", and a cell formed by an LTE radio node is referred to as an "LTE cell".

Requirements related to the SA and NSA may be discussed as follows (refer to Section 5.1.5 of NPL 1).

The SA and NSA are supported for an access link.

The NSA and SA are both discussed for a backhaul link.

The discussion takes E-UTRA-NR dual connectivity (EN-DC) into consideration for the NSA access link and backhaul link.

The following is assumed from the above-described requirements.

IAB node 10 is available for using an initial connection procedure same as that for UE 20 at initial connection with a network.

IAB node 10 for the NSA is also assumed.

When new IAB node 10 is to be connected with a network (for example, existing IAB node 10) through the initial connection procedure same as that for UE 20, existing IAB node 10 would be required to satisfy the following requirements (A1) and (A2) to support initial connection from new IAB node 10.

(A1) Transmission of a Synchronization Signal (SS)/Physical Broadcast Channel (PBCH) block on a "sync raster" in a period equal to or shorter than 20 ms.

(A2) Transmission of SIB1 (Remaining Minimum SI (RMSI)).

However, it is assumed that IAB node 10 does not move unlike normal UE 20 or the movement frequency and distance of IAB node 10 are lower and shorter than those of normal UE 20. Thus, it is assumed that the switching frequency of the connection destination at IAB node 10 is lower than that at UE 20. In addition, it is assumed that IAB node 10 has less restrictions on a size, a battery, and a processing load than those of UE 20. Thus, it is assumed that IAB node 10 may be allowed in increasing processing load of, for example, signal detection in comparison with UE 20. It is understand from such differences between UE 20 and IAB node 10 that SS/PBCH block transmission and/or SIB1 transmission to IAB node 10 at a high frequency (for example, a frequency equivalent to a frequency for UE 20) is not required.

The above-described requirements (A1) and (A2) are not essential for an NSA operation (primary secondary cell (PSCell) operation under EN-DC) for UE. Thus, the above-described requirements (A1) and (A2) provide a disadvantage such as overhead increase at IAB node 10 that is not in the SA operation (in the NSA operation). Thus, the following (B1) and/or (B2) are discussed for IAB node 10 in the NSA operation.

(B1) The transmission period of the SS/PBCH block and/or the SIB1 may be longer than 20 ms. Alternatively, the transmission period may be equal to or longer than 20 ms.

(B2) When not in the SA operation (in other words, in the NSA operation), part of parameter information in the SIB1 (RMSI), such as cell selection information and/or SI scheduling information, is not necessarily needed.

Meanwhile, new IAB node 10 is required to perform a procedure to establish Radio Resource Control (RRC) connection of transmission and reception processing such as a Random Access Channel (RACH) for an initial connection to a network. Thus, when existing IAB node 10 only provides a function essential for the NSA operation for UE, it is insufficient for the initial connection of new IAB node 10. For example, in the NSA operation for UE, when UE 20 is available to receive the SIB1 in an LTE cell, reception of the SIB1 in an NR cell is not essential, and thus UE 20 does not need to receive the SIB1 in the NR cell. However, not receiving the SIB1 in new IAB node 10 is insufficient for initial connection of new IAB node 10 with a network, and new IAB node 10 needs to receive part of information in the SIB1.

<Overview of Initial Connection Procedure for IAB Node>

Figure 3:
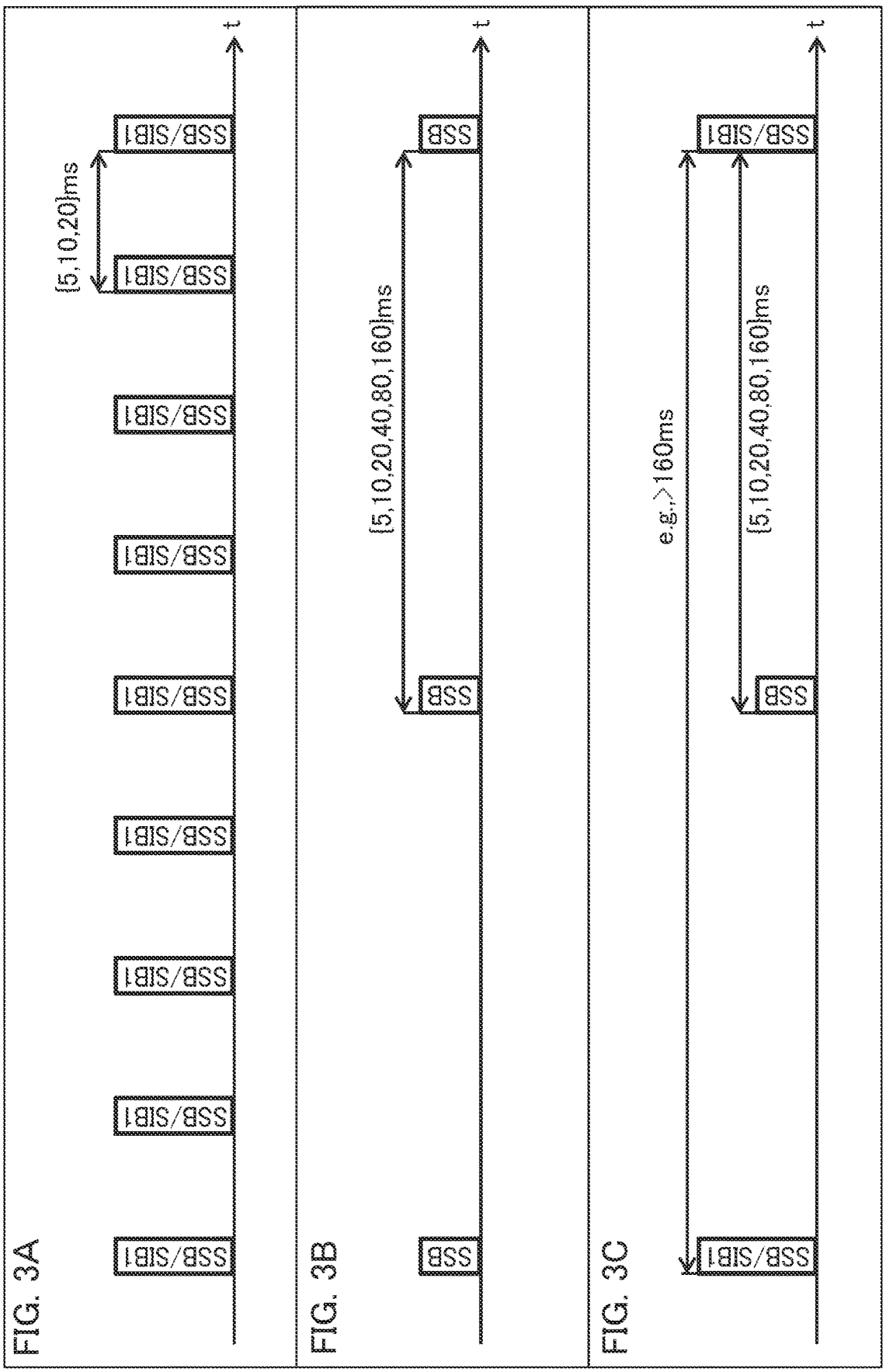
FIGS. 3A to 3C are diagrams for description of a transmission periods of a Synchronization Signal Block (SSB) and a System Information Block (SIB) 1 according to an embodiment of the present invention.

The following describes an initial connection procedure for an IAB node according to the present embodiment with reference to FIG. 3. FIG. 3A illustrates exemplary SSB and SIB1 transmission periods of the NR cell in the SA operation. FIG. 3B illustrates an exemplary SSB transmission period of the NR cell in the NSA operation. FIG. 3C illustrates exemplary SSB and SIB1 transmission periods of existing IAB node 10 in the NSA operation according to the present embodiment.

For example, the following procedures (C1) and/or (C2) different from those for a UE are defined as an initial connection procedure for an IAB node.

(C1) New IAB node 10 assumes, for example, an SS/PBCH block transmission period equal to or longer than 20 ms, and performs SS/PBCH block detection. Specifically, new IAB node 10 assumes a transmission period equal to or longer than the SS/PBCH block transmission period in the NR cell in the SA operation illustrated in FIG. 3A. The maximum value of this transmission period may be equal to or larger than 160 ms (refer to FIG. 3C).

(C2) Existing IAB node 10 may transmit part of information in the SIB1 in a period (for example, at a timing) same as that of the SS/PBCH block. Alternatively, existing IAB node 10 may transmit the part of information in the SIB1 in a period different from that of the SS/PBCH block (for example, once in every two transmission timings of the SS/PBCH block) (FIG. 3C). The transmitted part of information in the SIB1 may include, for example, cellAccess-RelatedInfo and/or servingCellConfigCommonSIB as parameter information. The transmitted part of information in the SIB1 may include no cell selection and/or SI scheduling as parameter information.

In the above-described (C2), existing IAB node 10 may use part of information included in PBCH (MIB) to notify at least one of the existence of the above-described part of information in the SIB1 (or PDCCH scheduling the part of information) and the above-described information related to the transmission period.

Alternatively, in the above-described (C2), information for indicating at least part of information related to the transmission timing and/or period of the above-described part of information in the SIB1 (or PDCCH scheduling the part of information) may be fixed (or defined) in specifications. For example, it may be defined that this information is indicated by the higher X bits (X is an integer equal to or larger than one) of a System Frame Number (SFN).

According to the initial connection procedure for an IAB node, existing IAB node 10 transmits signals for initial connection of new IAB node 10 in a longer transmission period and/or transmits a smaller amount of information, thereby reducing signal overhead and improving the efficiency of frequency use.

<Details of Initial Connection Procedure for IAB Node>

The following describes the above-described initial connection procedure for an IAB node in detail with reference to FIGS. 4, 5A, and 5B. FIG. 4 illustrates exemplary MIB definition. FIG. 5A illustrates exemplary definition of $k_{SSB}$ in Frequency Range (FR) 1. FIG. 5B illustrates exemplary definition of $k_{SSB}$ in FR 2. FR 1 may be a range of 450 MHz to 6.0 GHz, and FR 2 may be a range of 24.25 GHz to 52.6 GHz.

In a case of initial connection for a UE, UE 20 assumes that the SS/PBCH block transmission period at the initial connection is 20 ms (refer to Section 4.1 of NPL 3).

Meanwhile, for an IAB node, IAB node 10 may assume that the SSB transmission period at the initial connection is longer than 20 ms described above. IAB node 10 may assume that the SSB transmission period is 40 ms, 80 ms, or 160 ms.

For a UE, UE 20 determines the existence of SIB1 transmission based on the configuration of ssb-SubcarrierOffset ($k_{SSB}$) (refer to Section 4.1 of NPL 3). The ssb-SubcarrierOffset ($k_{SSB}$) is used for the determination of the existence of SIB1 transmission at UE 20, and used for notification of the subcarrier offset between the SSB and the SIB1. Specifically, in FR 1, UE 20 determines that a control resource set for Type0-PDCCH Common Search Space exists when $k_{SSB} \leq 23$ is satisfied, and determines that no control resource set for Type0-PDCCH Common Search Space exists when $k_{SSB} > 23$ is satisfied (refer to FIG. 5A). In FR 2, UE 20 determines that a control resource set for Type0-PDCCH Common Search Space exists when $k_{SSB} \leq 11$ is satisfied, and determines that no control resource set for Type0-PDCCH Common Search Space exists when $k_{SSB} > 11$ is satisfied (refer to FIG. 5B). The existence of a control resource set for Type0-PDCCH Common Search Space corresponds to transmission of the SIB1, and no existence of a control resource set for Type0-PDCCH Common Search Space corresponds to no transmission of the SIB1.

Meanwhile, for IAB node, the following (D1) or (D2) may be defined as an option.

(D1) For an IAB node, IAB node 10 recognizes (or determines) the existence of SIB1 transmission by a method same as that for a UE described above. Specifically, in FR 1, IAB node 10 determines that the SIB1 exists when $k_{SSB} \leq 23$ is satisfied, and determines that no SIB1 exists when $k_{SSB} > 23$ is satisfied (refer to FIG. 5A). In FR 2, IAB node 20 determines that the SIB1 exists when $k_{SSB} \leq 11$ is satisfied, and determines that no SIB1 exists when $k_{SSB} > 11$ is satisfied (refer to FIG. 5B). However, in the NSA operation, in order to prevent UE 20 having received information (MIB) for an IAB node from wrongly interpreting that the SIB1 exists, existing IAB node 10 notifies information (barred) indicating inhibition of the interpretation. For example, existing IAB node 10 gives the notification by setting the parameter value "barred" to the parameter information "cellBarred" of the MIB illustrated in FIG. 4. Thus, IAB node 10 performs determination of the existence of the SIB1 by the above-described method even when the parameter value "cellBarred" of the MIB is the parameter value "barred".

(D2) For an IAB node, IAB node 10 recognizes (or determines) the existence of SIB1 transmission by using a method different from that for a UE described above. For example, a PBCH reserved bit is used, and new interpretation of the other PBCH bits when the reserved bit is used is defined. The following describes a specific example of (D2). Exemplary interpretation of each information of the MIB illustrated in FIG. 4 in the case of (D2) is described below.

<ssb-SubcarrierOffset>

For an IAB node, information (or value) that does not impact on the operation of UE 20 among values of $k_{SSB}$ for which no SIB1 is interpreted by UE 20 in ssb-SubcarrierOffset, which is one element of the parameter information of the MIB illustrated in FIG. 4, is notified. For example, $k_{SSB}=30$ is notified in FR 1, and $k_{SSB}=14$ is notified in FR 2. The reason for value of $k_{SSB}$ being set to be "30" or "14" is that these values are "Reserved" as illustrated in FIGS. 5A and 5B and do not impact on the operation of UE 20. Accordingly, UE 20 interprets that no SIB1 exists as described above since $k_{SSB}=30>23$ is satisfied in FR 1 and $k_{SSB}=14>11$ is satisfied in FR 2.

<Spare>

For an IAB node, a value with which it can be interpreted that the SIB1 for IAB node 10 exists is notified in spare as one element of the parameter information of the MIB illustrated in FIG. 4. For example, bit "1" is notified in the spare. Alternatively, no bit of the spare is used, and it is interpreted that the SIB1 for an IAB node exists when ssb-SubcarrierOffset has a particular value (for example, 30 or 14).

In notification of the existence of the SIB1 for an IAB node by using ssb-SubcarrierOffset, the existence of the SIB1 for an IAB node is notified by using the value of Reserved as described above. In this case, the subcarrier offset between the SSB and the SIB1, which is notified by ssb-SubcarrierOffset for a UE, is not notified for an IAB node. Thus, when the existence of the SIB1 for an IAB node is notified by using ssb-SubcarrierOffset, the subcarrier offset between the SSB and the SIB1 may be notified by another method. For example, the subcarrier offset between the SSB and the SIB1 may be notified by pdcch-ConfigSIB1.

<pdcch-ConfigSIB1>

For an IAB node, at least one of the SSB-SIB1 subcarrier offset and PDCCH CORESET/search space configuration (PDCCH configuration) is notified in pdcch-ConfigSIB1 as one element of the parameter information of the MIB illustrated in FIG. 4. The following describes an example of the notification.

In FR 1, five bits among a total of eight bits of pdcch-ConfigSIB1 are used for notification of the subcarrier offset between the SSB and the SIB1, and the remaining three bits are used for notification of PDCCH configuration of the SIB1 for an IAB node. In FR 2, four bits among the total of eight bits are used for notification of the subcarrier offset between the SSB and the SIB1, and the remaining four bits are used for notification of PDCCH configuration of the SIB1 for an IAB node.

The PDCCH configuration may include at least one of elements of information related to the period, timing, time frequency resource position (or position relative to the SSB), and CORESET resource configuration of the SIB1 PDCCH for an IAB node. Information expressed by each code point may be different by combination of at least one or two or more of Subcarrier Spacing (SSB SCS), SIB1 SCS, FR 1 or FR 2, and a band minimum channel bandwidth. For example, a table may be defined for each SCS combination or defined for each minimum channel bandwidth.

<SubCarrierSpacingCommon>

For an IAB node, the SCS of the SIB1 is notified as normally done in SubCarrierSpacingCommon, which is one element of the parameter information of the MIB illustrated in FIG. 4.

<Modifications>

In the above description, IAB node 10 and UE 20 are distinguished from each other, but the present embodiment is not limited thereto. In other words, IAB node 10 and UE 20 may be equivalently treated without being distinguished from each other. For example, UE 20 may be connected with existing IAB node 10 (or IAB donor 10A) in place of new IAB node 10. In other words, a radio node may be any of IAB node 10, IAB donor 10A, and UE 20, or may be others. For example, a radio node may be expressed as, for example, a terminal, a radio station, or a relay node, In the above description, an access link and a backhaul link are distinguished from each other, but the present embodiment is not limited thereto. For example, the radio link between IAB node 10 and UE 20 may be an exemplary backhaul link. The radio link between IAB nodes 10 may be an exemplary access link. The above-described access link and/or backhaul link are exemplary various radio links. For example, the above-described access link and/or backhaul link may be expressed as side links.

<Summary of the Present Disclosure>

In the present disclosure, a radio node (for example, an IAB node) includes: a reception section configured to receive information used for initial access to another radio node in a first cell, and a control section configured to control initial access based on the information. The control section controls reception of the information based on a period equal to or longer than a period defined for a user terminal in a second cell at transmission of the information.

With this configuration, it is possible to optimize the procedure of initial connection of the radio node with a backhaul link.

The Embodiment of the present disclosure has been described above.

<Hardware Configuration>

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or radio) connected, and the plurality of apparatuses may implement the functional blocks.

Figure 6:
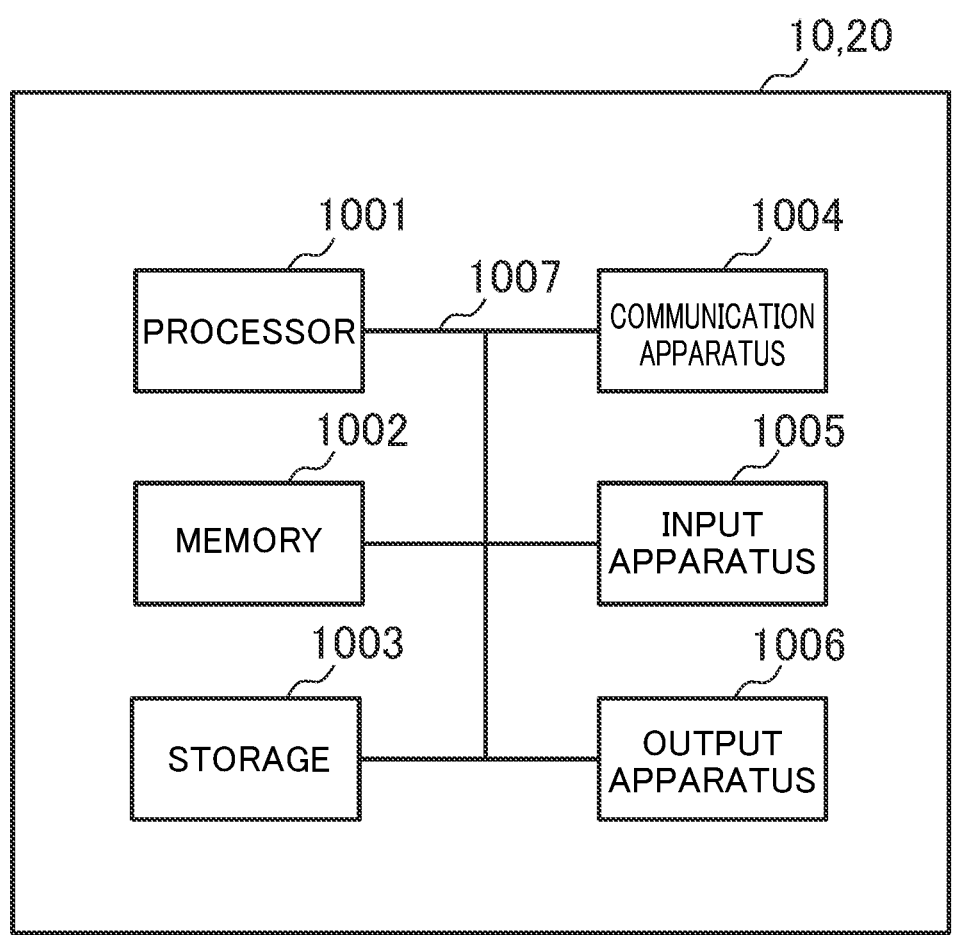
FIG. 6 illustrates exemplary hardware configurations of an IAB donor, an IAB node, and a user terminal according to an embodiment of the present invention.

For example, IAB donor 10A, IAB node 10, UE, and the like according to an embodiment of the present invention may function as a computer that executes processing of a radio communication method of the present invention. FIG. 6 illustrates an example of a hardware configuration of IAB donor 10A, IAB node 10, and UE according to an embodiment of the present invention. IAB donor 10A, IAB node 10, and UE 20 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of IAB donor 10A, IAB node 10, and UE 20 may include one apparatus or a plurality of apparatuses illustrated in the drawings or may not include part of the apparatuses.

The functions in IAB donor 10A, IAB node 10, and UE 20 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control sections 100, for-UE radio communication section 103, for-BH radio communication section 104, and the like as described above may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, control section 100 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or radio network and is also called, for example, a network device, a network controller, a network card, or a communication module. For example, for-UE radio communication section 103, for-BH radio communication section 104, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, IAB donor 10A, IAB node 10, and user terminal 20 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

<Notification and Signaling of Information>

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

<Applicable System>

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

(Processing Procedure and the Like)

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

<Operations of Base Station>

Specific operations which are described in the specification as being performed by the base station may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME or S-GW). Although there is one network node in addition to the base station in the case illustrated above, a plurality of other network nodes may be combined (for example, MME and S-GW).

<Direction of Input and Output>

The information and the like (see paragraph "Information and Signals") can be output from a higher layer (or a lower layer) to a lower layer (or a higher layer). The information, the signals, and the like may be input and output through a plurality of network nodes.

<Handling of Input and Output Information and the Like>

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (for example, comparison with a predetermined value).

<Variations and the Like of Aspects>

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

(Meaning and Interpretation of Terms)

<Software>

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a radio technique, such as an infrared ray, a radio wave, and a microwave, the wired technique and/or the radio technique is included in the definition of the transmission medium.

<Information and Signals>

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

<"System" and "Network">

The terms "system" and "network" used in the present specification can be interchangeably used.

<Names of Parameters and Channels>

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

<Base Station>

The base station can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

<Mobile Station>

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client or by some other appropriate terms.

<Meaning and Interpretation of Terms>

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

<"Connected" and "Coupled">

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

<Reference Signal>

The reference signal can also be abbreviated as RS and may also be called a pilot depending on the applied standard.

<Meaning of "Based On">

The description "based on" used in the present specification does not mean "based only on," unless otherwise specifically stated. In other words, the description "based on" means both of "based only on" and "based at least on."

<"First" and "Second">

Any reference to components through words such as "first" and "second" used in the present specification does not generally limit the amounts of the components or the order thereof. These words are used in the present specification as a method useful for distinguishing two or more components obtains. Thus, the reference to first and second components does not mean that only the two components are employed nor that the first component precedes the second component in any form.

<Means>

The "means" in the configuration of each apparatus may be replaced with "section," "circuit," "device," or the like.

<Open Form>

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

<Time Unit of TTI and the Like, and Radio Frame Configuration>

The radio frame may be constituted by one frame or a plurality of frames in the time domain. The one frame or each of the plurality of frames may be called a subframe in the time domain. The subframe may be further constituted by one slot or a plurality of slots in the time domain. The slot may be further constituted by one symbol or a plurality of symbols (OFDM symbol, SC-FDMA symbol, or the like) in the time domain. The radio frame, the subframe, the slot, and the symbol indicate time units in transmitting signals. The radio frame, the subframe, the slot, and the symbol may be called by other corresponding names. For example, in the LTE system, the base station creates a schedule for assigning radio resources to each mobile station (such as frequency bandwidth that can be used by each mobile station and transmission power). The minimum time unit of scheduling may be called a TTI (Transmission Time Interval). For example, one subframe, a plurality of continuous subframes, or one slot may be called a TTI. The resource block (RB) is a resource assignment unit in the time domain and the frequency domain, and the resource unit may include one subcarrier or a plurality of continuous subcarriers in the frequency domain. In addition, the resource block may include one symbol or a plurality of symbols in the time domain, and may have a length of one slot, one subframe, or one TTI. One TTI and one subframe may be constituted by one resource block or a plurality of resource blocks. The structure of the radio frame is illustrative only, and the number of subframes included in the radio frame, the number of slots included in the subframe, the numbers of symbols and resource blocks included in the slot, and the number of subcarriers included in the resource block can be changed in various ways.

<Maximum Transmission Power>

"Maximum transmission power" described in the present example means the maximum value of transmission power but is not limited thereto, and may be, for example, the nominal maximum transmission power (nominal UE maximum transmit power) or the rated maximum transmission power (nominal UE maximum transmit power).

<Article>

When articles, such as "a," "an," and "the" in English, are added by translation in the entire disclosure, the articles include plural forms unless otherwise clearly indicated by the context.

INDUSTRIAL APPLICABILITY

An aspect of the present disclosure is useful for a radio communication system.

REFERENCE SIGNS LIST

1 Radio communication system
10A IAB donor
10B, 10C, 10D IAB node
20 User terminal
100 Control section
102 Storage section
103 For-UE radio communication section
104 For-BH radio communication section

The invention claimed is:

1. A radio node, comprising:
a control section that assumes, for an initial access, a second period longer than a first period of a first synchronization signal/physical broadcast channel block (SSB) for a terminal; and
a reception section that acquires a second SSB for the radio node, in accordance with the second period,
wherein the control section monitors transmission of system information for the radio node based on information transmitted in the second SSB.

2. The radio node according to claim 1, wherein the first period is 20 ms, and the second period is 160 ms.

3. The radio node according to claim 1, wherein the reception section acquires, during the initial access, system information for a radio node in accordance with a method identical to a method for acquiring system information by the terminal.

4. A radio communication method, comprising:
assuming by a radio node, for an initial access, a second period longer than a first period of a first synchronization signal/physical broadcast channel block (SSB) for a terminal;
acquiring, by the radio node, a second SSB for the radio node in accordance with the second period; and
monitoring transmission of system information for the radio node based on information transmitted in the second SSB.

5. A radio node, comprising:
a control section that assumes, for an initial access of another radio node, a second period longer than a first period of a first synchronization signal/physical broadcast channel block (SSB) for a terminal; and
a transmission section that transmits, a second SSB for the other radio node in accordance with the second period,
wherein the transmission section transmits information in the second SSB, the information being for the other radio node to monitor transmission of system information for the other radio node.

* * * * *